June 10, 1958 J. A. HERRMANN 2,838,620
BUS DUCTS
Filed Dec. 23, 1952
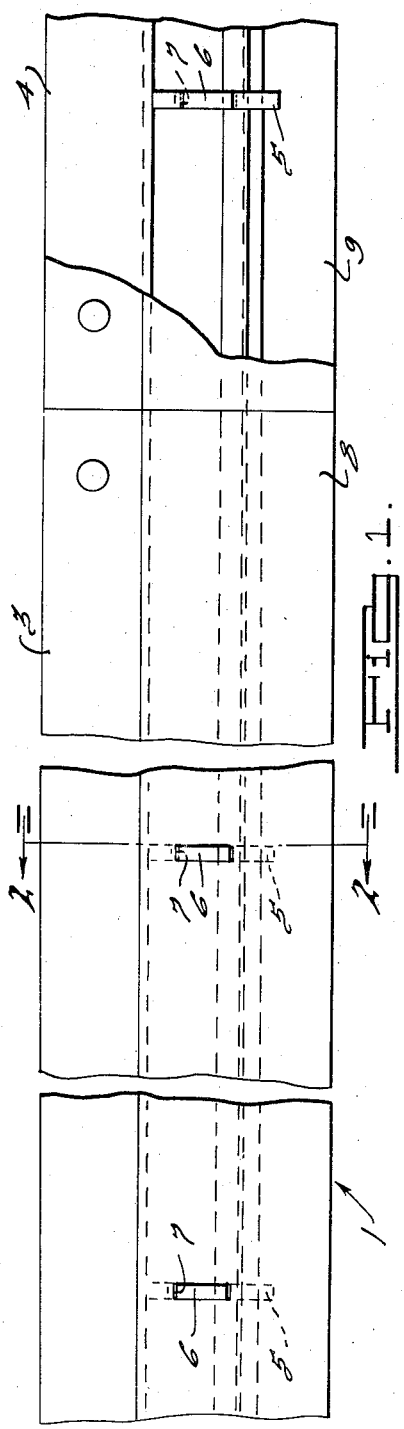
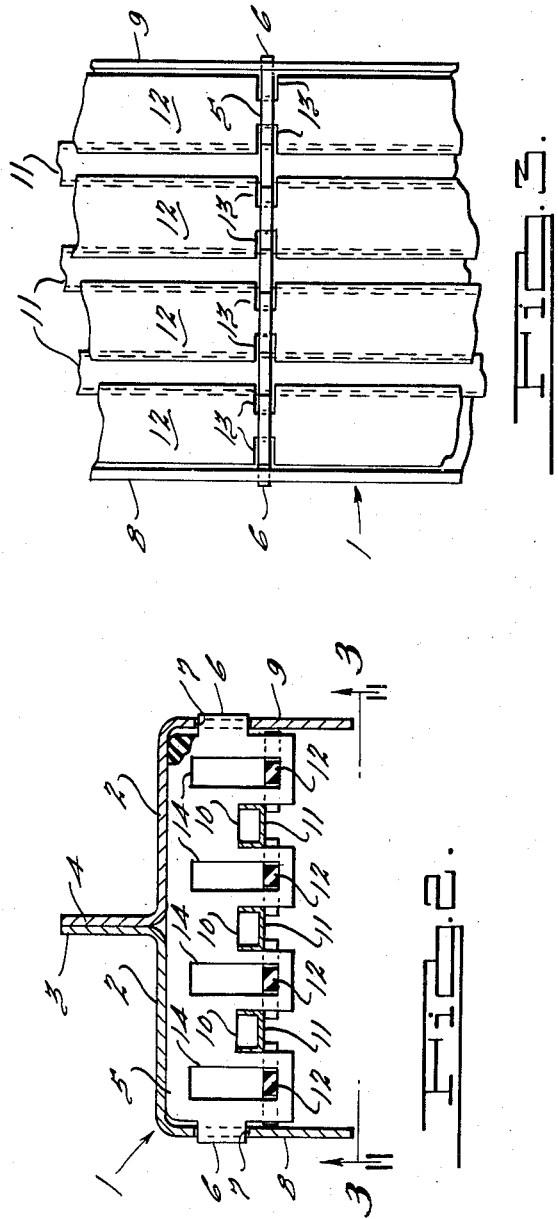
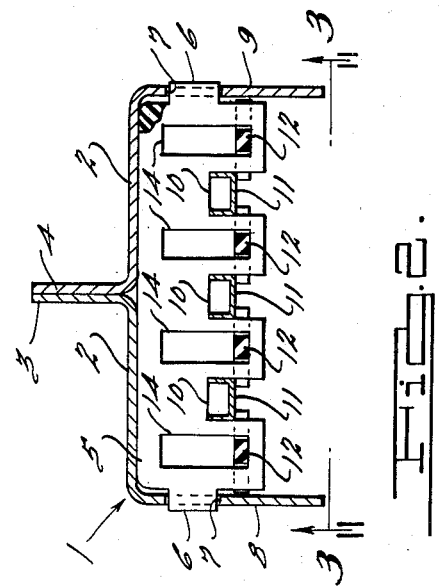
INVENTOR.
John A. Herrmann
BY
S Eugene Bychinsky
ATTORNEY

United States Patent Office 2,838,620
Patented June 10, 1958

2,838,620

BUS DUCTS

John A. Herrmann, Grosse Pointe Farms, Mich., assignor, by mesne assignments, to I-T-E Circuit Breaker Company, Philadelphia, Pa., a corporation of Pennsylvania Application December 23, 1952, Serial No. 327,585

11 Claims. (Cl. 191—23)

This invention relates to bus ducts and more particularly to a novel structure by which bus bars can be mounted within an open bottom duct. This structure is characterized by extreme simplicity, economy of manufacture; and when applied to trolley ducts, as in the embodiment hereinbelow shown, greatly increases efficiency of use for trolleys riding along the duct.

A principal object of this invention is to provide a bus duct construction in which the bus bars may be mounted without the use of screws or other holding devices merely by threading the insulator strips into place and then sliding the bus bars into position within the duct.

It is a further object of this invention to provide a duct in which longitudinally extending bus bars may be installed or replaced individually, simply and rapidly, greatly reducing thereby the risk of interruption in production operations due to mechanical failure.

Further objects of the present invention will be readily understood upon reference to the appended drawings and specification:

Fig. 1 is a fragmentary side elevational view of the trolley duct.

Fig. 2 is an enlarged sectional view of the trolley duct as if on line 2—2 of Fig. 1.

Fig. 3 is a fragmentary bottom view of Fig. 2, as if on line 3—3 of Fig. 2.

Referring to the drawings, the preferred embodiment of the invention herein described comprises an open bottom trolley duct. Fig. 1 shows a portion of a section of such duct comprised of two ogee-shaped metal duct halves 2 which are suitably joined together as by rivets to form a casing 1. Within this casing 1 are mounted several longitudinally spaced transverse insulator supports 5 made of fibre or some other suitably rigid, dielectric material. Each such insulator support 5 is held in place within said casing 1 by flanges 6 which extend from the sides thereof and project through slots 7 in side walls 8 and 9 of said casing 1. In each of the several such longitudinally spaced insulator supports 5 of a length of duct, there are several transversely spaced alined slots 10, in each of which there is disposed a length of resilient U-shaped bus bar 11 made of electrically conductive material. These bus bars 11 have resilient properties, so that when inserted into the respective slots 10 of such insulator supports 5, the legs of such U-shaped bus bars 11 are biased outwardly against the walls of such slots 10 to resist displacement in any direction.

Spaced equidistantly in relation to notches 10 of insulator supports 5 are rectangularly shaped alined holes 14. These holes 14 receive insulator strips 12, the longitudinally spaced symmetrical notches 13 of which engage the vertical edges of rectangular holes 14 in such supports 5 to be retained thereby against longitudinal displacement. The several insulator strips 12, by extending underneath the bus bars 11, cooperate with each other and with the walls of slots 10 to retain the resilient bus bars 11 in position within said slots 10 of said insulator supports 5 against gravitational displacement. The edges of said strips 12 in extending downward from said bus bars 11 form slots capable of furnishing guidance to current collectors in their paths along said bus bars 11.

A length of bus duct is assembled in the following manner: Flanges 6 on one side of several transverse insulator supports 5 are first inserted into appropriate slots 7 in the walls of a casing half 2. Slots 7 in the other casing half 2 are then lined up with similar flanges 6 on the opposite side of such insulator supports 5, and the top flanges 3 and 4 of the casing halves are then firmly secured together. Insulator strips 12 are then inserted, one each, through alined rectangular holes 14 in such insulator supports 5, the flat surfaces of such strips being kept parallel to the walls of the casing. When notches 13 in such strips 12 have been lined up with rectangular holes 14 in the supports 5, the insulator strips 12 are rotated into a position in which their flat surfaces are parallel to the open bottom of the duct. In this position notches 13 in said strips 12 will straddle the vertical edges of rectangular holes 14 in said supports 5, thereby locking said strips 12 into position within said casing 1. The several U-shaped bus bars 11 may then be inserted at one end of a particular length of duct and slideably placed into position within the alined slots 10 of the several insulator supports 5 to complete the assembly.

I claim:

1. In a bus duct having an open bottom casing, a plurality of longitudinally spaced transverse insulator supports mounted in said casing, each of said supports having a plurality of transversely spaced vertical slots, horizontally extending resilient conductors disposed in said slots, each of said supports having a plurality of horizontally transversely spaced openings extending longitudinally therethrough, and insulating and supporting means secured in said support openings and having portions extending beyond the opening and below the conductors, each of said supports being operatively positioned in engagement with a bottom surface of said conductors along the longitudinal edges of said surface for substantially the full length of said conductors thereby securing and insulating said conductors in said support slots, said insulating and supporting means comprising longitudinally extending strips, at least one of said strips in engagement with two of said conductors.

2. In a bus duct having an open bottom casing, a plurality of horizontally extending and longitudinally spaced transverse insulator supports mounted in said casing, said supports having a plurality of transversely spaced vertical slots, resilient conductors disposed in said slots, each of said supports having a plurality of horizontally transversely spaced openings, and insulating and supporting means secured in said support openings and operatively positioned in engagement with the bottom surfaces of said conductors along the edges thereof for securing and insulating said conductors in said support slots, said insulating and supporting means comprising longitudinally extending strips, said strips having longitudinally spaced notches, said strips having transversely extending portions between said notches for supporting and insulating said conductors, said insulator supports being operatively positioned within said notches to prevent longitudinal movement of said strips.

3. In a bus duct having an open bottom casing, a plurality of horizontally extending and longitudinally spaced transverse insulator supports mounted in said casing, said supports having a plurality of transversely spaced vertical slots, resilient conductors disposed in said slots, each of said supports having a plurality of horizontally transversely spaced openings, and insulating and supporting means secured in said support openings and having portions extending beyond the opening and below the conductors, each of said supports being operatively positioned in engagement with the bottom surfaces of said conductors along the edges thereof for securing and insulating said conductors in said support slots, said insulating and supporting means comprising longitudinally extending strips, said strips being inserted in said support openings for assembly and being supported by the lower and secured by the side walls of said openings.

4. In a bus duct having an open bottom casing, a plurality of horizontally extending and longitudinally spaced transverse insulator supports mounted in said casing, said supports having a plurality of transversely spaced vertical slots, resilient conductors disposed in said slots, each of said supports having a plurality of horizontally transversely spaced openings, and insulating and supporting means secured in said support openings and operatively positioned in engagement with the bottom surfaces of said conductors along the edges thereof for securing and insulating said conductors in said support slots, said insulating and supporting means comprising longitudinally extending strips, said strips being inserted in said support openings for assembly and being supported by the lower and secured by the side walls of said openings, said strips having longitudinally spaced notches, and extending portions between said notches for supporting and insulating said conductors, said insulator supports being operatively positioned within said notches to prevent longitudinal movement of said strips.

5. In a bus duct having an open bottom casing, a plurality of horizontally extending and longitudinally spaced transverse insulator supports mounted in said casing, said supports having a plurality of transversely spaced vertical slots, resilient conductors disposed in said slots, each of said supports having a plurality of horizontally transversely spaced openings, and insulating and supporting means secured in said support openings and operatively positioned in engagement with the bottom surfaces of said conductors along the edges thereof for securing and insulating said conductors in said support slots, said insulating and supporting means comprising longitudinally extending strips, said strips having longitudinally spaced notches, and transversely extending portions between said notches for supporting and insulating said conductors, said strip notches engaging the periphery of said support openings at the vertical sides thereof whereby said strips are securely locked against longitudinal displacement.

6. In a bus duct having an open bottom casing, a plurality of extending and longitudinally spaced transverse insulator supports mounted in said casing, said supports having a plurality of transversely spaced vertical slots, resilient conductors disposed in said slots, each said supports having a plurality of horizontally transversely spaced openings, and insulating and supporting means secured in said support openings and operatively positioned in engagement with the bottom surfaces of said conductors along the edges thereof for securing and insulating said conductors in said support slots, said insulating and supporting means comprising longitudinally extending strips, said strips being insertable in said support openings for assembly and being supported and secured by the walls of said openings, said strips having longitudinal spaced notches and transversely extending portions between said notches for supporting and insulating said conductors, said strip notches engaging the periphery of said support openings along the sides thereof whereby said strips are securely locked against longitudinal displacement.

7. In a bus duct having an open bottom casing, a plurality of longitudinally spaced transverse insulator supports mounted in said casing, said supports having a plurality of transversely spaced vertical slots, horizontally extending resilient conductors disposed in said slots, said conductors resiliently engaging the walls of said slots, each said supports having a plurality of horizontally transversely spaced openings, and insulating and supporting means secured in said support openings and having portions extending beyond the opening and below the conductors, each of said supports being operatively positioned in engagement with the bottom surfaces of said conductors along the edges thereof for securing and insulating said conductors in said support slots, said insulating and supporting means comprising longitudinally extending strips.

8. In a bus duct having an open bottom casing, a plurality of longitudinally spaced transverse insulator supports mounted in said casing, said supports having a plurality of transversely spaced vertical slots, horizontally extending resilient conductors disposed in said slots, said conductors resiliently engaging the walls of said slots, each of said supports having a plurality of horizontally transversely spaced openings, and insulating and supporting means secured in said support openings and having portions extending beyond the opening and below the conductors, each of said supports being operatively positioned in engagement with the bottom surfaces of said conductors along the edges thereof for securing and insulating said conductors in said support slots, said insulating and supporting means comprising strips, said strips having longitudinally spaced notches, and transversely extending portions between said notches for supporting and insulating said conductors, said insulator supports being operatively positioned within said notches to prevent longitudinal movement of said strips.

9. In a bus duct having an open bottom casing, a plurality of longitudinally spaced transverse insulator supports mounted in said casing, said supports having a plurality of transversely spaced slots, resilient conductors disposed in said slots, said conductors resiliently engaging the walls of said slots, said supports having a plurality of transversely spaced openings, and insulating and supporting means secured in said support openings and having portions extending beyond the opening and below the conductors, each of said supports being operatively positioned in engagement with the bottom surfaces of said conductors along the edges thereof for securing and insulating said conductors in said support slots, said insulating and supporting means comprising longitudinally extending strips, said strips being inserted in said support openings for assembly, said strips being supported by the bottom and secured by the side walls of said openings.

10. In a bus duct having an open bottom casing, a plurality of longitudinally spaced transverse insulator supports mounted in said casing, said supports having a plurality of transversely spaced vertical slots, horizontally extending resilient conductors disposed in said slots, said conductors resiliently engaging the walls of said slots, each of said supports having a plurality of horizontally transversely spaced openings, and insulating and supporting means secured in said support openings and operatively positioned in engagement with the bottom surfaces of said conductors along the edges thereof for securing and insulating said conductors in said support slots, said insulating and supporting means comprising longitudinally extending strips, said strips having longitudinally spaced notches, and transversely extending portions between said notches for supporting and insulating said conductors, said strips being insertable in said support openings for assembly, said strips being supported and secured by the walls of said openings, said insulator supports being operatively positioned within said notches to prevent longitudinal movement of said strips.

11. In a bus duct having an open bottom casing, a plurality of longitudinally spaced transverse insulator supports mounted in said casing, said supports having a plurality of transversely spaced vertical slots, longitudinally extending resilient conductors disposed in said slots, said conductors resiliently engaging the walls of said slots, each of said supports having a plurality of horizontally transversely spaced openings, and insulating and supporting means secured in said support openings and operatively positioned in engagement with the bottom surfaces of said conductors along the edges thereof for securing and insulating said conductors in said support slots, said insulating and supporting means comprising longitudinally extending strips, said strips having longitudinally spaced notches, and transversely extending portions between said notches for supporting and insulating said conductors, said strip notches engaging the periphery of said support openings along the sides thereof whereby said strips are securely locked against longitudinal displacement.

References Cited in the file of this patent

UNITED STATES PATENTS

| | | |
|---|---|---|
| 2,082,281 | Frank | June 1, 1937 |
| 2,322,640 | Jackson et al. | June 22, 1943 |
| 2,429,857 | Verner | Oct. 28, 1947 |
| 2,495,526 | King | Jan. 24, 1950 |